May 31, 1960    S. TESZNER    2,939,057
UNIPOLAR FIELD-EFFECT TRANSISTORS
Filed May 27, 1958    6 Sheets-Sheet 1

INVENTOR
STANISLAS TESZNER
By Saffitz & Gulko
ATTORNEYS

May 31, 1960  S. TESZNER  2,939,057
UNIPOLAR FIELD-EFFECT TRANSISTORS
Filed May 27, 1958  6 Sheets-Sheet 2

INVENTOR
STANISLAS TESZNER
BY Saffitz & Sulko
ATTORNEYS

May 31, 1960   S. TESZNER   2,939,057
UNIPOLAR FIELD-EFFECT TRANSISTORS
Filed May 27, 1958   6 Sheets-Sheet 5

INVENTOR
STANISLAS TESZNER
BY Saffitz & Gulko
ATTORNEYS

May 31, 1960     S. TESZNER     2,939,057
UNIPOLAR FIELD-EFFECT TRANSISTORS
Filed May 27, 1958     6 Sheets-Sheet 6

INVENTOR
STANISLAS TESZNER
BY: Saffitz & Hulko
ATTORNEYS

United States Patent Office 2,939,057
Patented May 31, 1960

2,939,057
UNIPOLAR FIELD-EFFECT TRANSISTORS
Stanislas Teszner, 49 Rue de la Tour, Paris, France
Filed May 27, 1958, Ser. No. 738,155
Claims priority, application France May 27, 1957
8 Claims. (Cl. 317—235)

The present invention relates to unipolar field-effect transistors of conical or pyramidal shape and to methods for the manufacturing of such transistors.

Unipolar field-effect transistors are known in the prior art, which have a cylindrical shape or a parallelepiped shape. Those with cylindrical shape are more widely known. They primarily consist of a rod of semi-conductive material of a certain type of conductivity and possesing a cylindrical portion of narrower diameter, two ohmic-contact electrodes on the terminal faces of said rod and one electrode termed the gate surrounding the narrowed portion of the rod and having with the semi-conductor a rectifying contact biased in the reverse direction, that is in the direction opposed to that of the current flow between the electrode and the semi-conductor. If a current is made to flow through this semi-conductor rod, the application of an electrical potential to the gate, and consequently of an electrical field which is transverse to the current, provides the possibility of modulating said current. According to assumptions currently accepted, this effect is due to the forming of space charges originating from the surface of the semi-conductor which is in contact with the gate electrode, said charges extending into the semi-conductor. The extent of such charges varies, all conditions being equal, with the intensity of the field present over the surface of the semi-conductor. If the dimensions of the narrowed portion of the semi-conductor rod in the direction of the field are larger than the extent of the space charges, then the semi-conductor rod is electrically neutral outside said charges and the electrical field therein is practically zero. It will be readily appreciated that there exists a reciprocal effect of the electrical field and the space charges: the electrical field causes an expansion of the charges, such expansion causing in turn an expansion of the electrical field. A potential difference is then set up between the exterior and the interior of the semi-conductor body.

The modulation, by the electrical field, of the conductive section of the rod termed the "conductive channel" and, consequently, of the resistance of the rod (therefore of the current flowing through the rod for a given value of voltage applied across the terminal electrodes) will be the more efficient as, for the same potential difference and the same type of semi-conductor, the extent of the space charges in relation to the overall section of the narrowed portion of the rod is greater. If the narrowed portion of the rod is of cylindrical shape, the extent of the area of space charges due to a given electrical field will be $\sqrt{2}$ times greater than would be the case when such narrowed portion is of parallelepiped shape. On the other hand, a given variation of the depth of the space charges results in a quadratic variation of the rod section affected by said charges. It may therefore be said that, with a unipolar field-effect transistor having a gate of cylindrical shape, a given percentage of modulation of the output current of the transistor can be obtained for a control voltage in the order of one third of that necessary to obtain the same percentage of modulation with a transistor embodying a control electrode which, instead of consisting of a circular ring surrounding a narrow cylindrical shape portion, is provided by two metallic layers or by two junctions deposited over the wide faces on either side of a narrowed parallelepiped shape portion.

The family of characteristic curves for a unipolar cylindrical shape gate transistor showing the drain current versus drain voltage for different values of gate bias voltages is qualitatively similar to that obtained with a pentode of conventional type. However such curves are markedly different when assessed quantitatively: in the case of a pentode, the grid bias voltage (several volts) required for cutting-off the anode current is generally lower than the normal anode voltage by one or two orders of magnitude than the normal anode voltage (several hundred volts), whereas, in the case of a unipolar cylindrical shape gate transistor, both voltages are of the same order of magnitude. Consequently, for the same value of anode current, the trans-conductance is markedly lower in the latter case than in the former.

Another adverse factor with cylindrical gate transistors is the non-linearity of the drain current versus gate voltage characteristic which is liable to cause a marked distortion of the signal when the output current is fairly large.

The difference between pentodes and unipolar cylindrical shape gate transistors primarily results from the dissimilarity of their respective physical mechanisms. Whereas, with pentodes, the grid behaves as a barrier intervening between the anode and the cathode, with unipolar cylindrical shape transistors, the gate pinches-off the channel, first in one point and then gradually along the whole length of said channel as bias voltage is increased. However, on closer analysis of the operating conditions of such a transistor, whether of constant gate section or of section varying symmetrically on either side of the median plane of the gate, it is observed that these conditions are not rational because the electrical stress exerted on the channel is far from being uniform over the whole length of said channel.

The applicant has found that these characteristics can be largely improved if the gate is given a section which is no longer constant but varying from one extremity to the other, increasing from the source to the drain in the case of a semi-conductor of n-type and increasing from the drain to the source in the case of a semi-conductor of p-type. Transistors embodying a gate of such shape will hereinafter be called conical gate transistors.

While the invention is essentially useful for the conversion of unipolar cylindrical gate transistors into unipolar conical gate transistors, it is equally applicable to the conversion of unipolar parallelepiped shape gate transistors into unipolar pyramidal or prismatical gate transistors.

The invention will be better understood and its advantages better appreciated by the following detailed description as well as by the accompanying drawings in which.

Figure 8:
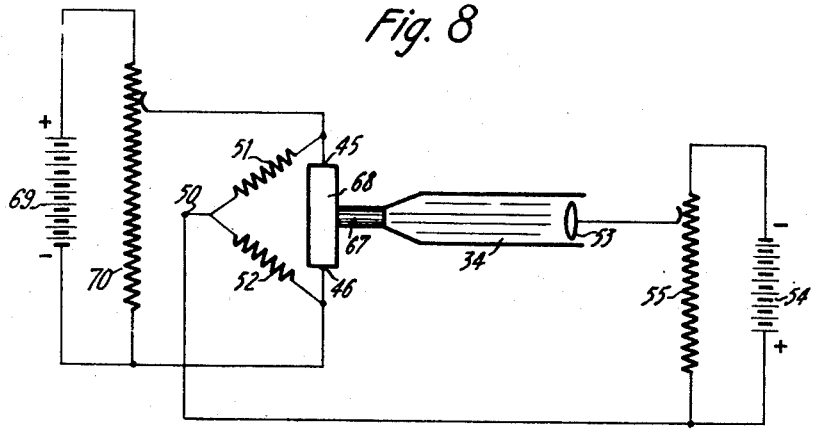
Figure 9:
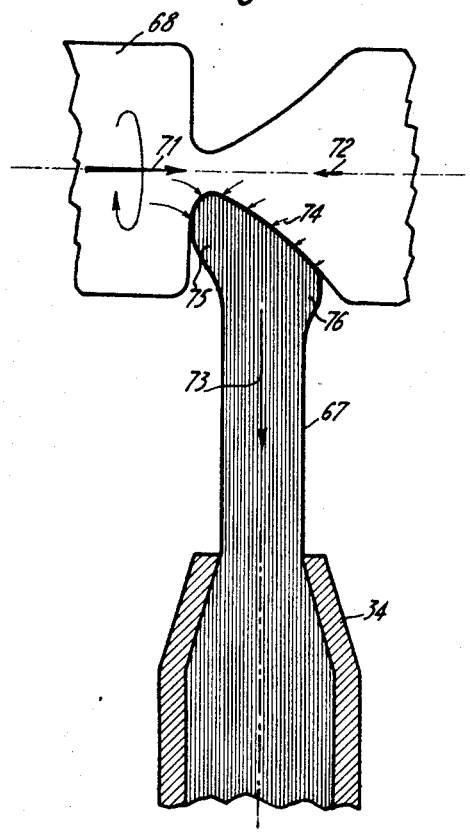
Figure 10:
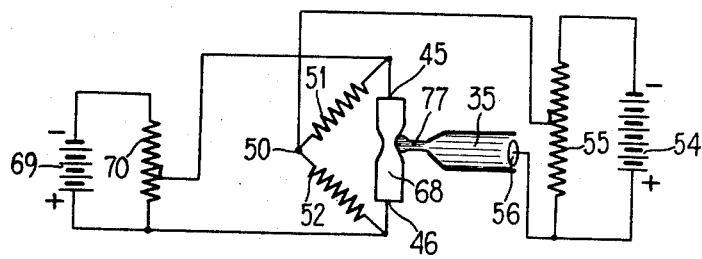
Figure 11:
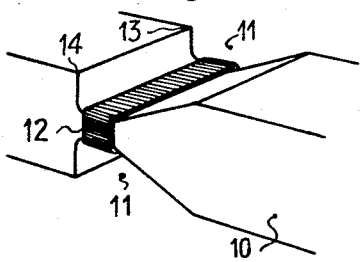
Figure 12:
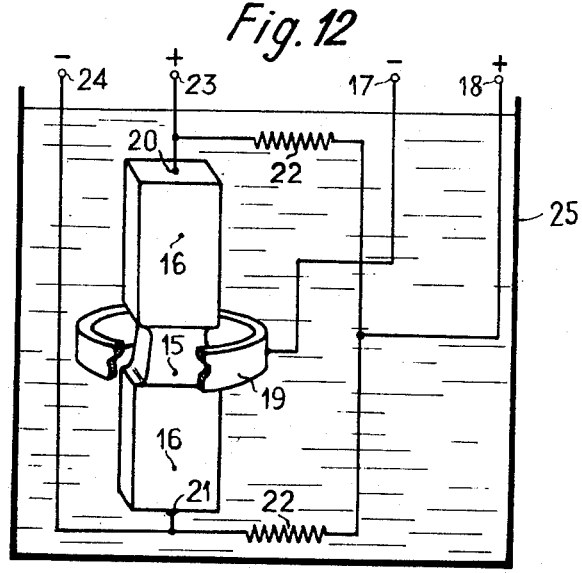

Figs. 8 to 10 refer to the method used for manufacturing unipolar field-effect conical gate transistors, and Figs. 11 and 12 refer to unipolar field-effect transistors of pyramidal and prism shapes and to their method of manufacturing.

Figure 1:
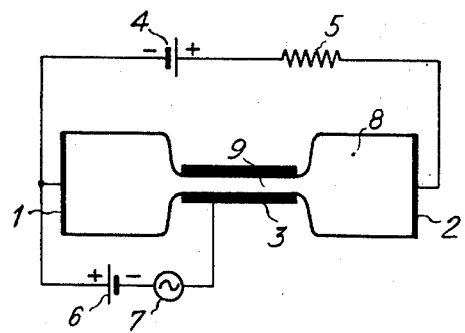
Fig. 1 represents a unipolar cylindrical shape transistor of the prior art.

Fig. 1 is a simplified electrical circuit diagram of a voltage and power amplifier embodying a unipolar transistor. In the figure, 8 represents a semi-conductor rod with a narrowed portion 9. 1 represents the source electrode, 2 the drain, 3 the gate, 4 the source of drain potential, 5 the load impedance, 6 the source of gate bias voltage and 7 the generator of the signal to be amplified. The polarity of the bias voltage source 6 and the arrangement of the connections between the gate bias voltage source and the source and gate electrodes respectively, correspond to the case of a semi-conductor of n-type which will be taken by way of illustration. For a semi-conductor of p-type, the polarity of the bias voltage source 6 must be reversed and the bias voltage source connected between the gate and drain electrodes. Gate 3 is an annular ring and narrowed portion 9 is of circular section.

Figure 2:
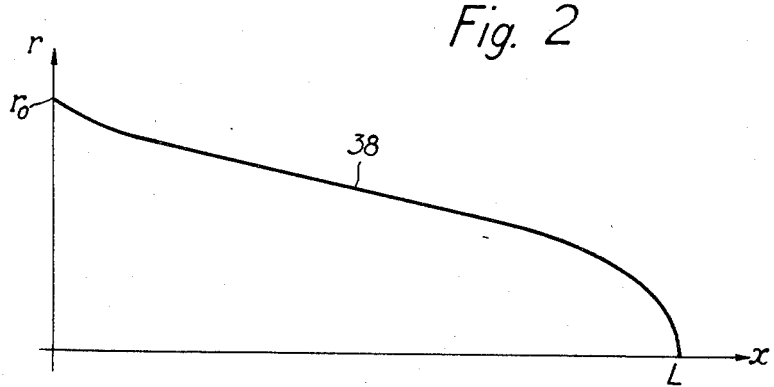
Fig. 2 shows a cross-section of the conductive channel of a cylindrical shape transistor under certain conditions of operation.

Fig. 2 illustrates the cross-section of the conductive channel of the transistor of Fig. 1. Gate 3 has a length L and a constant diameter $r_0$. Curve 38 represents the variation of conductive channel diameter from $r_0$ to zero, for a drain voltage $V_a = V_0$ ($V_0$ being the total pinch-off voltage) and a gate voltage $V_g = 0$, against abcissa $x$ of a given current point of the channel.

Figure 3:
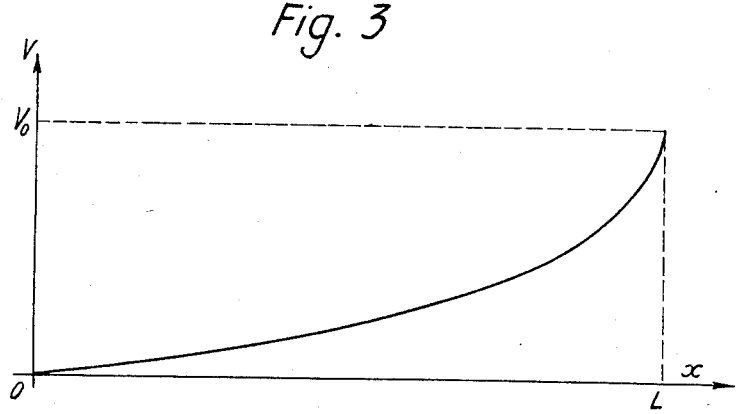
Figs. 3 and 4 show the distribution of the potential difference between the gate and the conductive channel of the same transistor under certain conditions of operation.

Fig. 3 represents the distribution of the electrical potential $V$ along the channel for the same transistor and under the same conditions $V_a = V_0$ and $V_g = 0$.

Figure 4:
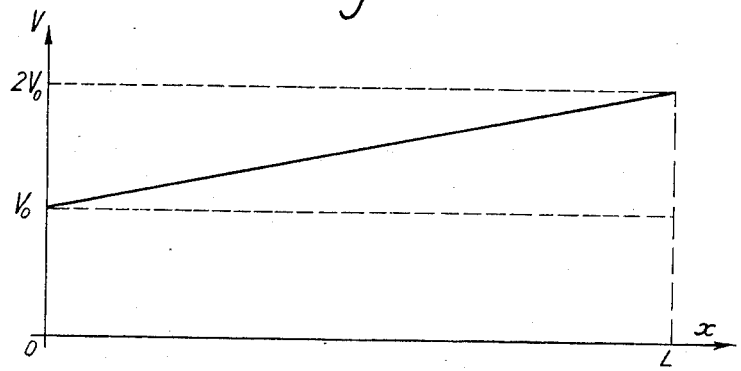

Fig. 4 represents the distribution of the potential $V$ along the channel for the same transistor, but when $V_a = V_0$ and $V_g = -V_0$, corresponding to total current cut-off conditions. It will be observed that, in order to obtain a potential $V_0$ at the source end, the electrical stress at the drain end had to be wastingly doubled.

In actual practice, the gate section is never quite constant as a result of the actual material conditions of construction: the thinner section is located towards the center of the gate whereas the thicker section is located at both ends. However, this variation of the section is practically symmetrical on either side of the median plane of the gate and the aforesaid adverse factor still applies, although in slightly reduced form.

Now, according to the invention, a much larger measure of attenuation of the non-uniformity of the potential distribution along the channel can be achieved by constructing the unipolar field-effect transistor in a manner such that the gate section increases from one end to the other, and notably, from the source to the drain electrode in the considered case of a semi-conductor of n-type, and from the drain to the source electrode in the case of a semi-conductor of p-type. In the following case, by way of example and to fix ideas, the case of a semi-conductor of n-type will be considered, it being understood that the following embodiments are also applicable to a semi-conductor of p-type, provided the gate connection is altered accordingly and the voltage reversed.

Figure 5:
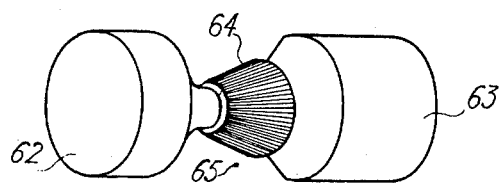
Fig. 5 shows a unipolar field-effect conical gate transistor.

Fig. 5 shows the cross-section of such a transistor featuring a gate section that increases from one end to the other. On the drawing, 62 and 63 indicate respectively the source and the drain electrodes, and 64 the gate deposited over the neck 65.

The effect of a configuration of that nature is easily appreciated. The total pinch-off voltage $V_0$ is no longer constant along the whole length of the channel but varies and becomes $V_0(x)$, $x$ representing the distance of the channel current point in relation to one end of the channel.

In order to ensure absolutely rational electrical stress conditions in the channel at normal operating conditions, the ratio of total pinch-off voltages $V_{01}$ and $V_{02}$, respectively at the end of the conductive channel near the source and at the end of the conductive channel near the drain, the ratio being designated by $k = V_{01}/V_{02}$ must equal:

$$k = \frac{V_{gt}}{V_{at} + V_{gt}} \qquad (1)$$

where $V_{at}$ is the drain voltage at the operating point and $V_{gt}$ is the corresponding gate bias voltage. This condition normally leads to relatively low values of $k$, the value of $V_{at}$ having to be 5 to 10 times higher than that of $V_{gt}$.

However, such a condition can only be approached, the limiting factor being due to the following restrictive condition: for the bias voltage $V_g = V_{01}$, total pinch-off conditions must be ensured over the whole length of the channel and, at least, at both ends of the channel. Therefore:

$$V_{02} \leq V_{at} + V_{01}$$

and $$k \geq \frac{V_{01}}{V_{at} + V_{01}} \qquad (2)$$

$V_{gt}$ being, for class-A operation, less than 0.5 $V_{01}$ the value of $k$ resulting from condition (2) is approximately double that resulting from condition (1). In actual fact, it is relatively impracticable to reduce $k$ beyond 0.25. However, the improvement relatively to the symmetrical configuration with respect to the median plane ($k = 1$) is considerable.

To fix ideas with a concrete example, the constituent elements of a non-cylindrical shape gate transistor constructed according to the invention will now be described, purely by way of indication, and a statement will be given of the results obtained and of their comparison with a similar transistor of cylindrical shape gate, both transistors being constructed from a germanium rod of n-type having a resistivity $\rho = 8$ ohm cm.

Constructional characteristics of a device featuring a gate section which increases from the source to the drain:

Length of the gate electrode _____ 150μ.
Gate diameter on the source side ___ 54μ.
Gate diameter on the drain side ____ 85μ.
Operating characteristics:
  Total pinch-off voltage—
    $V_{01}$ _____ 40 volts.
    $V_{02}$ _____ 100 volts.
  Normal operating voltages—
    $V_{at}$ _____ 60 to 70 volts.
    $V_{gt}$ _____ −10 volts.

Figure 6:
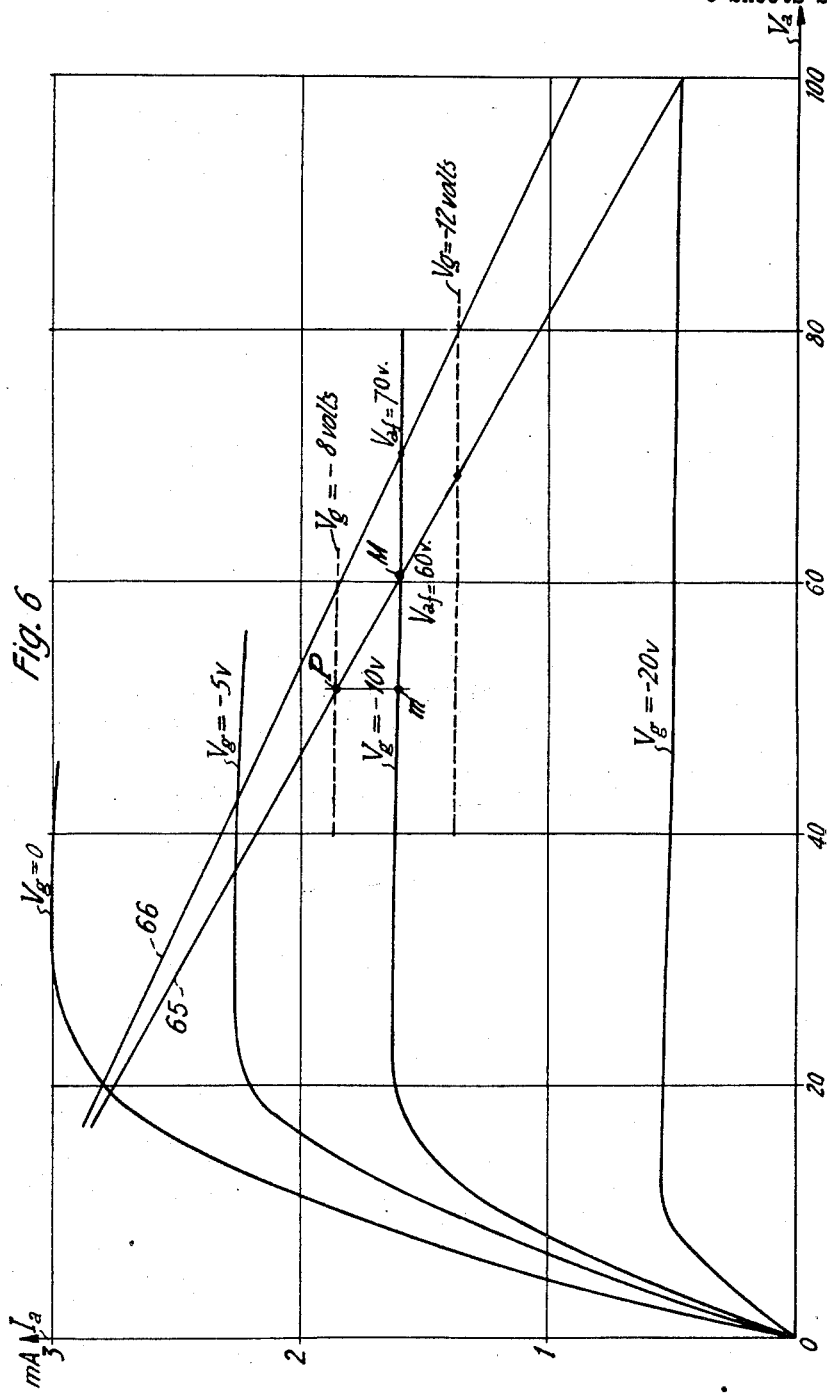
Figs. 6 and 7 represent characteristic curves relating to the transistor of Fig. 5 and to the transistor of Fig. 1 respectively.

Fig. 6 shows the family of "current $I_a$ versus drain voltage $V_a$" static characteristic curves for different voltages of gate $V_g$. Straight lines 65 and 66 are two load curves corresponding to maximum output powers for class-A operation with practically negligible distortion, for the two operating voltages, respectively:

$$V_{at} = 60 \text{ volts and } V_{at} = 70 \text{ volts}$$

the respective load resistances being 18 and 23 $k\Omega$.

Figure 7:
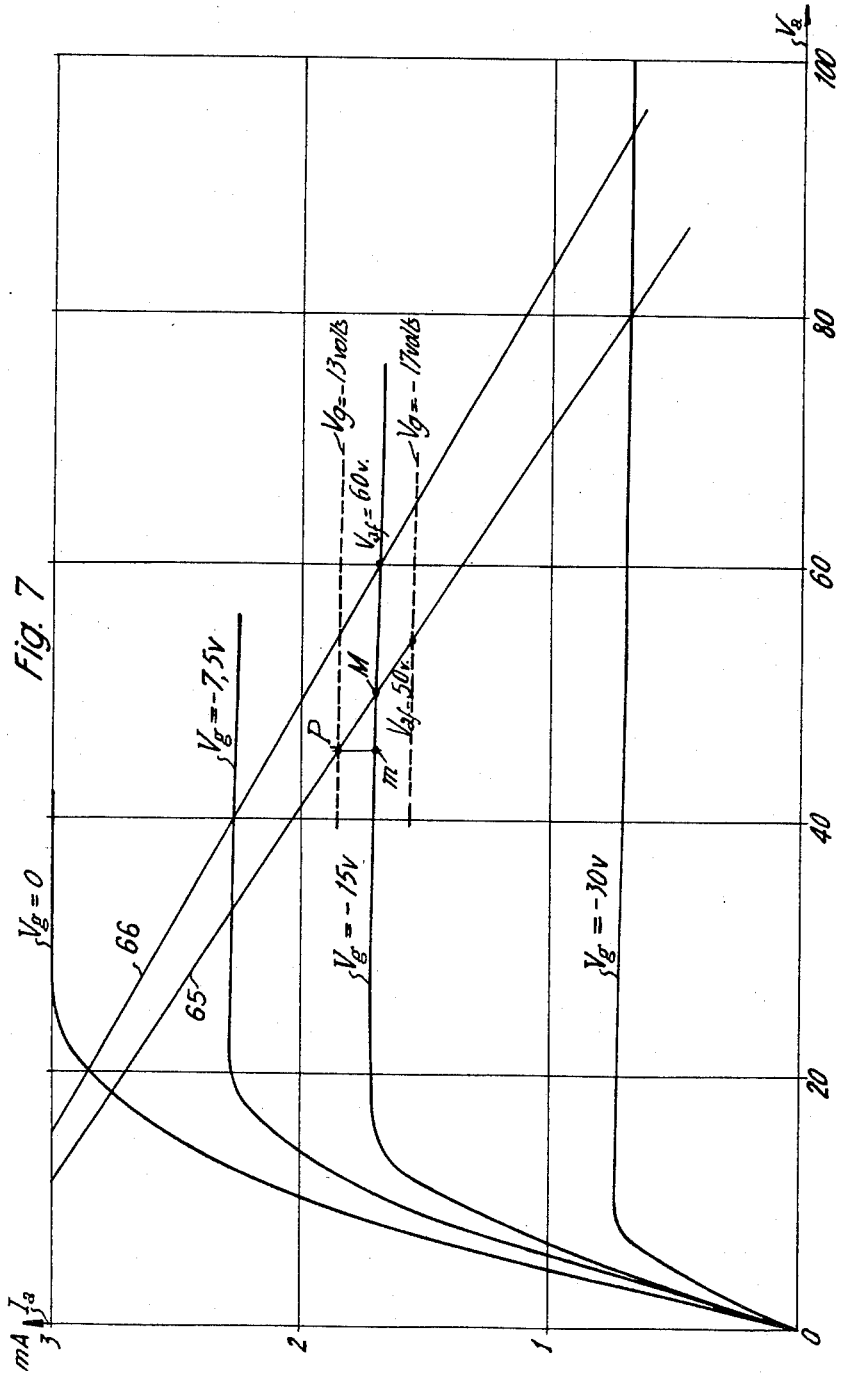

This family of curves should be compared with that of Fig. 7 corresponding to a similar transistor of practically constant circular section.

The constructional characteristics of such a transistor are as follows:

Length of gate electrode _____ 150 μ.
Minimum diameter of gate _____ 70 μ.
Operating characteristics:
  Total pinch-off voltage, $V_0$ _____ 68 volts.
  Normal operating voltages—
    $V_{at}$ _____ 50 to 60 volts.
    $V_{gt}$ _____ −15 volts.

The superior advantages of non-cylindrical shape gate transistors are readily appreciable: marked increase (more than 50%) of voltage gain $$\frac{Mm}{dV_g}$$

and of transconductance $$\frac{mP}{dV_g}$$

increase of output power. Concurrently, the distortion is notably attenuated.

This advantage is further confirmed by an analysis of the high-frequency operation and when the variation of drain-to-source capacitance is considered concurrently with the variation of drain-to-source resistance: it is known that the major proportion of such capacitance is located in the vicinity of the source for an n-type semi-conductor (and near the drain for a p-type semi-conductor). It will be appreciated that, for a given variation of gate voltage, the variation of the capacitance will be greater as the gate diameter on the source side (for a semi-conductor of n-type) or in the vicinity of the source is smaller, all conditions being equal.

The method used for the construction of a unipolar field-effect variable-section gate transistor will now be described:

The applicant has observed that, if over the etching and shaping current a unidirectional control current is superimposed which is sufficiently large to markedly modify the distribution of potential along the rod, there will result a dissymmetry of the neck portion forming the gate electrode. Furthermore, this dissymmetry can be controlled at will by acting on the control current and, consequently, on the control voltage across the rod terminals.

The diagram of the electrical circuit of the controlled etching system is shown in Fig. 8.

The conventional non-controlled etching circuit consists of a voltage source 54, supplying through the potentiometer and platinum electrode 53 a nozzle 34 directing an etching jet 67 onto the rod to be etched 68. The current flows on either side of the nozzle through the rod, and via terminals 45 and 46 and balancing resistors 51 and 52, reached terminal 50 which is common with the positive terminal of voltage source 54. The control circuit embodies a voltage source 69 which energizes the rod via potentiometer 70, causing a unidirectional current flow, according to the conventional direction, from terminal 45 to terminal 46. While being subjected to the etching jet, the rod is rotated within its axis.

It can be appreciated that the superimposition of this current over the normal etching current results in a modification of the voltage distribution within the rod. In particular, the upper section on the drawing (from jet 67 to terminal 45) is given a positive polarization whereas the lower section (from jet 67 to terminal 46) is given a negative polarization. Hence, the etching current will be increased in the upper section whereas it will be lower in the lower section.

The results thus obtained are illustrated in Fig. 9, where arrows 71 and 72 indicate the direction of the current obtained within the rod through the superimposition of the etching current 73 and the control current. Arrows 74 indicate the currents due to the etching process, the size of said arrows being roughly proportional to the respective current intensities.

It will be observed that the current is distributed in dissymmetrical manner, with, by way of consequence, a marked dissymmetry of neck configuration which, instead of assuming cylindrical shape, assumes that of a truncated cone without entailing the lengthening of the neck or a deterioration of the etching quality. A pronounced dissymmetry of lips 75 and 76 of jet 67 is also noticeable.

The degree of convergence of the truncated cone, that is the cone angle, can be adjusted to practically any requirement, by acting on the control current and, consequently, on the voltage across the terminals of the rod. It must be pointed out, however, that to obtain a marked effect, it is essential that the voltage per half length of the rod be high enough in absolute value and also in relative value with respect to the voltage drop due to the etching current. Quantitative data will be given hereinafter on the subject.

The conical shape gate is produced by means of the electroplating method described in application No. 764,105, filed on September 29, 1958, by the applicant (this application being a division of application No. 565,231 filed on February 13, 1956), without superimposition of a control current. However, if it is desired to limit the metallic deposit to a certain portion of the truncated cone, the method illustrated in the diagram of Fig. 10 can be utilized.

The electrical circuit is similar to that of Fig. 8, with this difference that, here, polarities are reversed. The deposit of electrolyte is applied by means of nozzle 35, electrolyte 77 being energized by platinum electrode 56. The control current affects the contour of the deposit due to the fact that, owing to the polarization of the surface of the component, the electrolytic deposit can be prevented on one side of the nozzle and materializes only on the other side. In the case of the cylindrical shape rod of Fig. 5, on which a truncated cone shape has been etched, the steep-fronted section of the neck being located on the side of terminal 45, the electrolytic deposit 64 will be limited, by suitable adjustment of the control voltage, to any desired portion of the slanting part of the neck.

To fix ideas, a concrete example of the embodiment of a conical shape gate transistor will now be given: Rod of n-type germanium, resistivity 4 ohm cms., diameter 0.5 mm., length 2 mm., fitted with welded metal tips at both ends.

Etching by jet application of a solution of $H_2SO_4$, concentration 0.02 N, etching current 1.5 ma.

Nozzle with aperture diameter of $150\mu$ ensuring the forming of a neck having a length of approximately $250\mu$.

Electrolyte jet flow rate = 1 cm.$^3$ per second.

Current control variable from approximately 20 to 11 ma., voltage being variable up to 20 volts. Immediately this voltage value is reached, it is kept constant while the current is gradually decreased to 11 ma. The operation is then stopped. Duration of process: approximately 8 minutes.

Results obtained: general shape conforming to that illustrated in Fig. 9. Diameter at trough of neck $45\mu$. Diameter of the conical portion $100\mu$ from the trough of the neck = $120\mu$ and $50\mu$ from the trough of the neck = $75\mu$.

Total rod resistance (mainly concentrated in the trough portion of the neck) = 2,500 ohms giving a voltage drop on either side of the rod equal to $$\frac{1.5 \times 10^{-3}}{2} \times \frac{2,500}{2}$$

that is, approximately 1 volt, a low value relatively to half the control voltage (10 volts).

Electroplating is equally feasible by jet application of an electrolyte consisting of a solution of $In_2(SO_4)_3$ in the proportion of 12 gr. per litre of water, with addition of $H_2SO_4$ giving a pH of approximately 2.5.

Nozzle with outlet aperture of $90\mu$, electrolyte jet flow rate of approximately 0.1 cubic centimeter per second, electroplating current = 100 $\mu A$. Duration of process: approximately 2 minutes.

Control current: 1 ma., voltage: approximately 2 volts, results obtained: general shape conforming to that illustrated in Fig. 5, length of deposited indium ring: approximately $50\mu$, that is 40% of that obtained in the absence of control current.

Fig. 11 shows a transistor of prism shape embodying a parallelepiped plate 10 on which a neck 11 of truncated pyramid shape has been etched, a metallic deposit 12 of well-defined contour being applied by electroplating method over the trough of said neck.

The transistor in Fig. 11 can be obtained by a method similar to that described in relation with Figs. 8 and 10 in which, instead imparting a rotary motion to the rod, the plate is imparted a reciprocal movement in front of the nozzle, parallel to the side 13—14. The transistor can also be produced by the following method (Fig. 12): a parallelepiped shape plate 15 in which the portions 16 which are not destined to treatment receive a prior protective coating (for instance, cellulose varnish), is held motionless. The etching current is applied via terminals 17 and 18 to a ring 19, preferably of platinum, surrounding the portion of the plate to be etched. The etching current flows on either side via electrodes 20 and 21, through the balancing resistors 22, to terminal 18 connected to the positive pole of a source of direct current. The control current enters the system through terminal 23 and leaves it through terminal 24.

The plate and the electrode are immersed in a tank 25 filled with an electrolyte which should preferably be kept in motion. The electrolyte may be of either the acid type (for instance $H_2SO_4$, as above), or of the basic type (for instance KOH at a concentration of about 0.02 to 0.05 N).

The electroplating process will be performed in similar manner, with this difference that the electrolyte employed in the etching process is replaced by a solution of a salt of the metal to be deposited (for instance, $In_2(SO_4)_3$, the composition of said electrolyte being the same as above), that the polarities of the two sources are reversed and that the current is suitably readjusted. By lowering the pH value to approximately 2.1, the same electrolyte can be utilized for both the etching and electroplating processes.

What I claim is:

1. Unipolar field-effect transistor comprising a rod of semi-conductive material, two electrodes welded on the end faces of said rod and having an ohmic contact therewith, forming the source and drain electrodes of the transistor, a narrowed portion in said rod near the center thereof, said portion having a cross-section continuously varying from its end on the side of the source electrode to its end on the side of the drain electrode, and a gate electrode surrounding said narrowed portion and having a rectifying contact therewith.

2. Unipolar field-effect transistor comprising a cylindrical rod of semi-conductive material, two electrodes welded on the end faces of said rod and having an ohmic contact therewith, forming the source and drain electrodes of the transistor, a conical shape narrowed portion in said rod near the center thereof and a conical shape gate electrode surrounding said narrowed portion and having a rectifying contact therewith.

3. Unipolar field-effect transistor comprising a rectangular cross-section semi-conductive rod, two electrodes welded on the end faces of said rod and having an ohmic contact therewith, forming the source and drain electrodes of the transistor, a pyramidal shape narrowed portion in said rod near the center thereof and a pyramidal shape gate electrode surrounding said narrowed portion and having a rectifying contact therewith.

4. Unipolar field-effect transistor according to claim 1, in which the semi-conductive material of the rod is n-type material and the cross-section of the narrowed portion increases from its end on the side of the source electrode to its end on the side of the drain electrode.

5. Unipolar field-effect transistor according to claim 1, in which the semi-conductive material of the rod is p-type material and the cross-section of the narrowed portion increases from its end on the side of the drain electrode to its end on the side of the source electrode.

6. Unipolar field-effect transistor comprising a rod of semi-conductive material of a given conductivity, two electrodes welded on the end faces of said rod and having an ohmic contact therewith, forming the source and drain electrodes of the transistor, a narrowed portion in said rod near the center thereof forming the channel of the transistor, said portion having a cross-section continuously varying from its end on the side of the source electrode to its end on the side of the drain electrode, and a gate electrode surrounding said narrowed portion and having a rectifying contact therewith, said variation of the cross-section being a function of the conductivity of the semi-conductive material and of the difference in the operating conditions of the transistor, between the uniform potential of the gate electrode and the gradually decreasing potential through the channel whereby the pinch-off voltage is quite the same for almost every cross-section of said narrowed portion surrounded by said gate electrode.

7. Unipolar field transistor comprising a cylindrical rod of semi-conductive material of a given conductivity, two electrodes welded on the end faces of said rod and having an ohmic contact therewith, forming the source and drain electrodes of the transistor, a conical shape narrowed portion in said rod near the center thereof forming the channel of the transistor, said portion having a cross-section continuously varying from its end on the side of the source electrode to its end on the side of the drain electrode and a conical shape gate electrode surrounding said narrowed portion and having a rectifying contact therewith, said variation of the cross-section being a function of the conductivity of the semi-conductive material and of the difference, in the operating conditions of the transistor, between the uniform potential of the gate electrode and the gradually decreasing potential through the channel whereby the pinch-off voltage is quite the same for almost every cross-section of said cylindrical narrowed portion surrounded by said cylindrical gate electrode.

8. Unipolar field transistor comprising a rectangular cross-section rod of semi-conductive material of a given conductivity, two electrodes welded on the end faces of said rod and having an ohmic contact therewith, forming the source and drain electrodes of the transistor, a pyramidal shaped narrowed portion in said rod near the center thereof forming the channel of the transistor, said portion having a cross-section continuously varying from its end on the side of the source electrode to its end on the side of the drain electrode and a pyramidal shaped gate electrode surrounding said narrowed portion and having a rectifying contact therewith, said variation of the cross-section of the narrowed portion being a function of the conductivity of the semi-conductive material and of the difference, in the operating conditions of the transistor, between the uniform potential of the gate electrode and the gradually decreasing potential through the channel whereby the pinch-off voltage is quite the same for almost every cross-section of said pyramidal narrowed portion surrounded by said pyramidal gate electrode.

References Cited in the file of this patent

UNITED STATES PATENTS

| | | |
|---|---|---|
| 2,561,123 | Kurshan | July 17, 1951 |
| 2,648,805 | Spenke et al. | Aug. 11, 1953 |
| 2,653,374 | Mathews et al. | Sept. 29, 1953 |
| 2,697,269 | Fuller | Dec. 21, 1954 |
| 2,744,970 | Shockley | May 8, 1956 |
| 2,805,397 | Ross | Sept. 3, 1957 |
| 2,869,055 | Noyce | Jan. 13, 1959 |
| 2,921,265 | Teszner | Jan. 12, 1960 |